US012534632B2

(12) United States Patent
Ichikawa et al.

(10) Patent No.: US 12,534,632 B2
(45) Date of Patent: Jan. 27, 2026

(54) AQUEOUS INK COMPOSITION, PRINTED MATERIAL, AND METHOD OF PRODUCING PRINTED MATERIAL

(71) Applicant: DIC Corporation, Tokyo (JP)

(72) Inventors: Ryota Ichikawa, Kitaadachi-gun (JP); Takahiro Nio, Kitaadachi-gun (JP); Keigo Gouda, Kitaadachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 17/776,279

(22) PCT Filed: Nov. 12, 2020

(86) PCT No.: PCT/JP2020/042180
§ 371 (c)(1),
(2) Date: May 12, 2022

(87) PCT Pub. No.: WO2021/106587
PCT Pub. Date: Jun. 3, 2021

(65) Prior Publication Data
US 2022/0403190 A1 Dec. 22, 2022

(30) Foreign Application Priority Data

Nov. 29, 2019 (JP) ................................. 2019-216580

(51) Int. Cl.
| | |
|---|---|
| *C09D 11/322* | (2014.01) |
| *B41J 2/01* | (2006.01) |
| *B41J 2/21* | (2006.01) |
| *C09D 11/108* | (2014.01) |
| *C09D 11/12* | (2006.01) |
| *C09D 11/38* | (2014.01) |
| *C09D 123/06* | (2006.01) |
| *C09D 123/12* | (2006.01) |

(52) U.S. Cl.
CPC .............. *C09D 11/322* (2013.01); *B41J 2/01* (2013.01); *B41J 2/2107* (2013.01); *C09D 11/108* (2013.01); *C09D 11/12* (2013.01); *C09D 11/38* (2013.01); *C09D 123/06* (2013.01); *C09D 123/12* (2013.01)

(58) Field of Classification Search
CPC ... C09D 11/328; C09D 11/033; C09D 11/037; C09D 11/108; C09D 11/12; C09D 11/322; C09D 11/40; C09D 11/38; C09D 11/36; C09D 11/30; C09D 11/32; C09D 11/324; C09D 11/101; C09D 11/102; C09D 11/005; C09D 11/54; C09D 11/52; C09D 11/106; B41J 2/01; B41J 2/2107; B41J 29/02; B41J 2/17513; B41J 2/17509; B41J 29/13; B41J 2/17553; B41J 2/1606; B41J 2/1642; B41J 2/1609; B41J 2/1433; B41J 2/164; B41J 2/162; B41J 2/161; B41J 2/19; B41J 15/04; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 2/211; B41J 2/17; B41J 2/17593; B41J 2/1755; B41J 2/2114; B41J 2/2117; B41J 2/2056; B41J 2/21; B41J 2/0057; B41J 3/60; B41J 2002/012; B41J 2/04598; B41M 5/502
See application file for complete search history.

(56) References Cited

U.S. PATENT DOCUMENTS

| | | | |
|---|---|---|---|
| 2004/0249018 A1* | 12/2004 | Kataoka ................. | C09D 11/30 523/160 |
| 2006/0258810 A1* | 11/2006 | Sugiura ..................... | C08J 5/06 525/207 |
| 2010/0166960 A1 | 7/2010 | Auslander et al. | |
| 2012/0236070 A1* | 9/2012 | Okuda ....................... | B41J 2/01 524/508 |
| 2013/0053485 A1* | 2/2013 | Misawa ............... | C09D 11/322 524/104 |
| 2013/0222477 A1 | 8/2013 | Fukuda et al. | |
| 2014/0125743 A1* | 5/2014 | Aruga .................. | C09D 11/322 347/100 |
| 2014/0232782 A1* | 8/2014 | Mukai .................... | B41J 2/2107 524/88 |
| 2016/0152848 A1* | 6/2016 | Kimura ................ | C09D 11/322 524/523 |

(Continued)

FOREIGN PATENT DOCUMENTS

| | | |
|---|---|---|
| CN | 101717596 A | 6/2010 |
| EP | 0978547 A1 | 2/2000 |

(Continued)

OTHER PUBLICATIONS

International Search Report dated Feb. 2, 2021, issued in counterpart International Application No. PCT/JP2020/042180 (2 pages).
International Search Report dated Feb. 2, 2021, issued in International application No. PCT/JP2020/042179 (counterpart to U.S. Appl. No. 17/775,674). (3 pages).
Notice of Reasons for Refusal dated Feb. 1, 2022, issued in JP application No. 2021-561286 (counterpart to U.S. Appl. No. 17/775,674), with English translation. (8 pages).
Non-Final Office Action dated May 2, 2025, issued in U.S. Appl. No. 17/775,674. (43 pages).
Final Office Action dated Oct. 9, 2025, issued in U.S. Appl. No. 17/775,674 (25 pages).

*Primary Examiner* — Manish S Shah
(74) *Attorney, Agent, or Firm* — WHDA, LLP

(57) ABSTRACT

Provided is an aqueous inkjet ink with which sufficient setting properties and image fastness are achieved even in printing on a less-ink-absorbent or non-ink-absorbent recording medium. An aqueous ink composition for use in an inkjet recording method includes a color material, an aqueous medium, a binder resin, and a wax. The binder resin includes an acid-modified polypropylene resin. The wax includes an oxidized polyethylene wax.

10 Claims, No Drawings

(56) References Cited

U.S. PATENT DOCUMENTS

| | | | |
|---|---|---|---|
| 2016/0222234 A1 | 8/2016 | Matsuyama et al. | |
| 2016/0319141 A1* | 11/2016 | Sugita | B41J 2/01 |
| 2017/0022379 A1 | 1/2017 | Loccufier et al. | |
| 2017/0369723 A1 | 12/2017 | Mizutaki et al. | |
| 2018/0273789 A1 | 9/2018 | Matsuzaki et al. | |
| 2019/0023923 A1* | 1/2019 | Yen | C09D 11/106 |
| 2021/0071022 A1 | 3/2021 | Kuroda et al. | |
| 2023/0220222 A1* | 7/2023 | Ichikawa | C09D 11/108 |
| | | | 106/31.86 |

FOREIGN PATENT DOCUMENTS

| | | |
|---|---|---|
| EP | 3279280 A1 | 2/2018 |
| JP | 56-155262 A | 12/1981 |
| JP | 11-349876 A | 12/1999 |
| JP | H11-349876 A | 12/1999 |
| JP | 2000-327974 A | 11/2000 |
| JP | 2001323196 A | 11/2001 |
| JP | 2003-20428 A | 1/2003 |
| JP | 2004-27204 A | 1/2004 |
| JP | 2005-036107 A | 2/2005 |
| JP | 2005-255878 A | 9/2005 |
| JP | 2008-231341 A | 10/2008 |
| JP | 2010065111 A | 3/2010 |
| JP | 2011-12226 A | 1/2011 |
| JP | 2013-216878 A | 10/2013 |
| JP | 2015-124379 A | 7/2015 |
| JP | 2019-108518 A | 7/2019 |
| JP | 2019119889 A | 7/2019 |
| JP | 2020-83942 A | 6/2020 |
| WO | 2007/131624 A1 | 11/2007 |
| WO | 2021/106586 A1 | 6/2021 |
| WO | 2021/200181 A1 | 10/2021 |

* cited by examiner

AQUEOUS INK COMPOSITION, PRINTED MATERIAL, AND METHOD OF PRODUCING PRINTED MATERIAL

TECHNICAL FIELD

The present invention relates to an aqueous ink composition, a printed material, and a method of producing a printed material.

BACKGROUND ART

Inkjet recording is a recording method in which ink droplets are ejected from extremely fine nozzles directly onto a recording material and attached thereto to form characters and images. This method is advantageous in that devices used produce less noise and are easy to handle. Moreover, with this method, color printing is easy. The inkjet recording method is therefore used not only in output machines in offices and homes but also in industrial applications.

Inks for the inkjet recording method (inkjet inks) include solvent inks, UV inks, and aqueous inks. Among these, the demand for aqueous inks is increasing in the background of environmental awareness (see, for example, PTL 1).

In recent years, the inkjet recording method has been expected to be used in a wider range of applications, and there has been a growing need for printing with aqueous inkjet inks not only on ink-absorbent recording media such as plain paper but also on less-ink-absorbent recording media or non-ink-absorbent recording media such as coated cardboard lined with coated paper.

CITATION LIST

Patent Literature

PTL 1: Japanese Unexamined Patent Application Publication No. 2011-12226

SUMMARY OF INVENTION

Technical Problem

However, in printing with an aqueous inkjet ink on a less-ink-absorbent or non-ink-absorbent recording medium, the ink fixability (setting properties) to the recording medium immediately after printing tends to be insufficient, sometimes causing inconvenience such as transfer of ink to a paper-feeding guide in rotary printing or setoff in sheet-fed printing. Moreover, after printing, it is difficult to obtain sufficient image fastness, and the ink coating sometimes peels off from the recording medium under the influence of friction, moisture, and the like.

An object of the present invention is to provide an aqueous inkjet ink with which sufficient setting properties and image fastness are achieved even in printing on a less-ink-absorbent or non-ink-absorbent recording medium.

Solution to Problem

An aspect of the present invention is directed to an aqueous ink composition for use in an inkjet recording method. The aqueous ink composition contains a color material, an aqueous medium, a binder resin, and a wax, in which the binder resin includes an acid-modified polypropylene resin and the wax includes an oxidized polyethylene wax. With the aqueous ink composition, sufficient setting properties and image fastness are achieved even in printing on a less-ink-absorbent or non-ink-absorbent recording medium.

Preferably, the acid-modified polypropylene resin has an amount of 0.5 to 3% by mass of the total amount of the aqueous ink composition.

Preferably, the oxidized polyethylene wax has a melting point of 140° C. or lower.

Preferably, the aqueous ink composition according to the above aspect further contains an acetylene-based surfactant.

The aqueous ink compositions according to the above aspect is suitably used in printing on a recording medium (less-ink-absorbent or non-ink-absorbent recording medium) in which the amount of water absorbed in a contact time of 100 msec between a recording surface and water is 10 $g/m^2$ or less.

Another aspect of the present invention is directed to a printed material made by printing the aqueous ink composition on a surface of a recording medium. The recording medium of the printed material may be a less-ink-absorbent or non-ink-absorbent recording medium.

Another aspect of the present invention is directed to a method of producing a printed material, the method including ejecting and printing the aqueous ink composition on a recording medium by an inkjet recording method in which the distance from a surface (x) having ink ejection holes of an inkjet head to a position (y) where a normal to the surface (x) intersects the recording medium is 1 mm or more. The recording medium used in this production method may be a less-ink-absorbent or non-ink-absorbent recording medium.

Advantageous Effects of Invention

The present invention can provide an aqueous inkjet ink with which sufficient setting properties and image fastness are achieved even in printing on a less-ink-absorbent or non-ink-absorbent recording medium.

DESCRIPTION OF EMBODIMENTS

Preferred embodiments of the present invention will be described below. However, the present invention is not intended to be limited by the following embodiments. In the present description, a numerical range indicated with "to" indicates a range that includes the numerical values listed before and after "to" as the minimum and maximum values, respectively. Upper limits and lower limits listed individually may be combined as desired. The term "aqueous ink composition" means that the water content in the total solvent in the ink composition is 40% by mass or more and that a water-insoluble solvent having a solubility in water at 20° C. of less than 0.5 g/100 mL (in the amount of 1% by mass or less of the total amount of the solvent) is substantially not included.

(Aqueous Ink Composition)

An aqueous ink composition in an embodiment is an aqueous ink composition for use in an inkjet recording method (also referred to herein as "aqueous inkjet ink") and contains a color material, an aqueous medium, a binder resin, and a wax, in which the binder resin includes an acid-modified polypropylene resin and the wax includes an oxidized polyethylene wax. In the aqueous ink composition, the color material, the binder resin, and the wax are preferably present in a dispersed or dissolved state in the aqueous medium that is a solvent.

With the aqueous ink composition, sufficient setting properties and image fastness are achieved even in printing on a less-ink-absorbent or non-ink-absorbent recording medium by the inkjet printing method. However, the recording medium is not limited to a less-ink-absorbent or non-ink-absorbent recording medium. For example, this aqueous ink composition enables printing by the inkjet recording method even on high ink-absorbent recording media commonly used in copiers, such as copy paper (PPC paper), recording media with an ink absorption layer, and the like.

"Less-ink-absorbent" means that the amount of water absorbed by a recording medium in a contact time of 100 msec between the recording surface of the recording medium and water is 10 g/m$^2$ or less, and "non-ink-absorbent" means that the amount of water absorbed is 0 g/m$^2$. The amount of water absorbed is the amount of water transferred in a contact time of 100 msec with pure water as measured at 23° C. and 50% relative humidity using an automatic scanning liquid absorptometer (KM500win available from KUMAGAI RIKI KOGYO Co., Ltd.). The measurement conditions are as follows.

[Spiral Method]
  Contact Time: 0.010 to 1.0 (sec)
  Pitch: 7 (mm)
  Length per sampling: 86.29 (degree)
  Start Radius: 20 (mm)
  End Radius: 60 (mm)
  Min Contact Time: 10 (ms)
  Max Contact Time: 1000 (ms)
  Sampling Pattern: 50
  Number of sampling points: 19
[Square Head]
  Slit Span: 1 (mm)
  Width: 5 (mm)

Examples of the less-ink-absorbent or non-ink-absorbent recording media include cardboard having a surface with a colored layer less absorbing a solvent in ink, art paper such as printing stock, coated paper, lightweight coated paper, slightly coated paper, and plastic films.

In printing with an aqueous inkjet ink on a less-ink-absorbent or non-ink-absorbent recording medium, it is preferable to suppress occurrence of density unevenness of an ink coating, called "mottling", and to suppress occurrence of streaky print defects, called "white streaks", in addition to achieving high setting properties and image fastness described above. In the aqueous ink composition of this embodiment, the amount of the acid-modified polypropylene resin is kept within a specific range to suppress the occurrence of mottling and white streaks and to improve storage stability of the aqueous ink composition.

The components of the aqueous ink composition will be described in detail below.

[Color Material]

Known, commonly-used pigments, dyes, and the like can be used as the color material. The color material may include one or both of a pigment and a dye. The color material preferably includes a pigment in terms of producing a printed material excellent in weather resistance and the like. The pigment may be coated with resin. In other words, a colorant in which the pigment is coated with resin can also be used as the color material.

The pigment may be any pigment, and organic pigments and inorganic pigments commonly used in aqueous gravure inks or aqueous inkjet inks can be used. The pigment may include one or both of an organic pigment and an inorganic pigment. Either an acid-untreated pigment or an acid-treated pigment can be used as the pigment.

Examples of the inorganic pigment that can be used include iron oxide and carbon black produced by a method such as a contact method, a furnace method, or a thermal method.

Examples of the organic pigment that can be used include azo pigments (azo lakes, insoluble azo pigments, condensed azo pigments, chelate azo pigments, etc.), polycyclic pigments (e.g., phthalocyanine pigments, perylene pigments, perinone pigments, anthraquinone pigments, quinacridone pigments, dioxazine pigments, thioindigo pigments, isoindolinone pigments, quinophthalone pigments, etc.), lake pigments (e.g., basic dye-type chelates, acid dye-type chelates, etc.), nitro pigments, nitroso pigments, and aniline black.

Examples of the pigment that can be used in black ink (black pigment) include C.I. Pigment Black 1, 6, 7, 8, 10, 26, 27, and 28. Among these, C.I. Pigment Black 7 is preferably used. Specific examples of the black pigment include No. 2300, No. 2200B, No. 900, No. 960, No. 980, No. 33, No. 40, No. 45, No. 45 L, No. 52, HCF88, MA7, MA8, MA100, and the like from Mitsubishi Chemical Corporation; Raven 5750, Raven 5250, Raven 5000, Raven 3500, Raven 1255, Raven 700, and the like from Columbian Chemicals Company; Regal 400R, Regal 330R, Regal 660R, Mogul L, Mogul 700, Monarch 800, Monarch 880 Monarch 900, Monarch 1000, Monarch 1100, Monarch 1300, Monarch 1400, and the like from Cabot Corporation; and Color Black FW1, Color Black FW2, Color Black FW2V, Color Black FW18, Color Black FW200, Color Black 5150, Color Black 5160, Color Black 5170, Printex 35, Printex U, Printex V, Printex 1400U, Special Black 6, Special Black 5, Special Black 4, Special Black 4A, NIPEX 150, NIPEX 160, NIPEX 170, NIPEX 180, and the like from Degussa AG.

Specific examples of the pigment that can be used in yellow ink (yellow pigment) include C.I. Pigment Yellow 1, 2, 12, 13, 14, 16, 17, 73, 74, 75, 83, 93, 95, 97, 98, 109, 110, 114, 120, 128, 129, 138, 150, 151, 154, 155, 174, 180, and 185.

Specific examples of the pigment that can be used in magenta ink (magenta pigment) include C.I. Pigment Red 5, 7, 12, 48 (Ca), 48 (Mn), 57 (Ca), 57:1, 112, 122, 123, 146, 176, 184, 185, 202, 209, 269, and 282; and C.I. Pigment Violet 19.

Specific examples of the pigment that can be used in cyan ink (cyan pigment) include C.I. Pigment Blue 1, 2, 3, 15, 15:3, 15:4, 15:6, 16, 22, 60, 63, and 66. Among these, C.I. Pigment Blue 15:3 is preferably used.

Specific examples of the pigment that can be used in white ink (white pigment) include sulfates and carbonates of alkaline earth metals, silicas such as fine silica powder and synthetic silicates, calcium silicate, alumina, alumina hydrate, titanium dioxide, zinc oxide, talc, and clay.

Preferably, the pigment undergoes a step for dispersing well in an aqueous medium in order to be stably present in ink. For example, a dispersibility-imparting group (a hydrophilic functional group and/or a salt thereof) or an active species having a dispersibility-imparting group may be bonded (grafted) directly or indirectly via an alkyl group, an alkyl ether group, an aryl group, or the like to the surface of the pigment. Such a self-dispersing pigment can be produced, for example, by vacuum plasma treatment, oxidation treatment with a hypohalous acid and/or a hypohalite, ozone oxidation treatment, or a wet oxidation process in which the pigment surface is oxidized by an oxidant in water, or by bonding a carboxy group via a phenyl group by bonding p-aminobenzoic acid to the pigment surface.

When a self-dispersing pigment is used, the inclusion of a pigment dispersant is unnecessary, and, therefore, foaming and the like resulting from a pigment dispersant can be suppressed and an aqueous ink composition with high ejection stability is easily obtained. Furthermore, when a self-dispersing pigment is used, significant increase in viscosity resulting from a pigment dispersant can be suppressed, and, therefore, a larger amount of pigment can be contained, and a printed material with high printing density is easily produced. A commercially available product can be used as the self-dispersing pigment. Examples of the commercially available product include Micro Jet CW-1 (product name; available from ORIENT CHEMICAL INDUSTRIES CO., LTD.), and CAB-O-JET 200 and CAB-O-JET 300 (product names; available from Cabot Corporation).

The amount of the color material is, for example, 1% by mass or more and may be 2% by mass or more of the total amount of the aqueous ink composition, in terms of ensuring a sufficient printing density. The amount of the color material is, for example, 15% by mass or less and may be 10% by mass or less of the total amount of the aqueous ink composition, in terms of easily suppressing the occurrence of streaks and in terms of easily achieving more excellent image fastness while keeping high dispersion stability of the color material. In these respects, the amount of the color material may be 1 to 15% by mass of the total amount of the aqueous ink composition. In the present embodiment, the amount of the pigment is preferably within the ranges above.

[Aqueous Medium]

The aqueous medium is, for example, water. Specifically, pure water or ultrapure water, such as ion-exchange water, ultra-filtered water, reverse osmosis water, and distilled water can be used. The amount of the aqueous medium is, for example, 30 to 90% by mass or 40 to 80% by mass of the total amount of the aqueous ink composition, in terms of achieving more excellent setting properties and in terms of easily achieving high ejection stability. The amount of the aqueous medium may be 30% by mass or more or 40% by mass or more, and may be 90% by mass or less or 80% by mass or less of the total amount of the aqueous ink composition.

The aqueous ink composition may contain a solvent component other than water (e.g., a water-soluble organic solvent), for example, for adjustment of viscosity. However, when a mixed solvent of water and a solvent component other than water (e.g., a water-soluble organic solvent) is used, the amount of water in the total solvent is 40% by mass or more and may be 50% by mass or more. The water-soluble organic solvent may be a known water-soluble organic solvent used for inkjet inks.

[Acid-Modified Polypropylene Resin]

The acid-modified polypropylene resin is a resin obtained by modifying polypropylene with one or two or more acid compounds and has a polypropylene-derived backbone (polypropylene backbone) and an acid compound-derived functional group. The polypropylene backbone has a structural unit mainly derived from propylene.

The polypropylene backbone may be a homopolypropylene (a monopolymer of propylene) backbone, may be a block polypropylene (a block copolymer of propylene and another olefin (e.g., ethylene)) backbone, or may be a random polypropylene (a random copolymer of propylene and another olefin (e.g., ethylene)) backbone. Examples of the other olefin include alkenes such as ethylene, isobutylene, 1-butene, 1-pentene, and 1-hexene. These components may be linear or branched. The carbon number of the other olefin component is, for example, 2 to 6.

The amount of the propylene component (the amount of the structural unit derived from propylene) in the polypropylene backbone is, for example, 60 mol % or more, and may be 70 mol % or more. When the polypropylene backbone is a block polypropylene backbone or a random polypropylene backbone, the amount of the propylene component (the amount of the structural unit derived from propylene) in the polypropylene backbone is, for example, 95 mol % or less, and may be 90 mol % or less.

The amount of the polypropylene backbone in the acid-modified polypropylene resin is, for example, 50 to 99% by mass of the total amount of the acid-modified polypropylene resin. The amount of the polypropylene backbone in the acid-modified polypropylene resin may be 50% by mass or more, 60% by mass or more, or 70% by mass or more, and may be 99% by mass or less, 95% by mass or less, or 90% by mass or less of the total amount of the acid-modified polypropylene resin.

The acid compound is, for example, a compound having an acid group such as a carboxy group and an acid anhydride group, or a derivative thereof. The derivative refers to a compound obtained by modifying (e.g., esterifying, amidating, or imidating) the acid group of the compound having an acid group. The number of acid groups in the acid compound may be one or more (e.g., two). Examples of the acid compound include unsaturated carboxylic acids, unsaturated carboxylic anhydrides, and derivatives thereof. Specifically, examples include (meth)acrylic acid, maleic acid, maleic anhydride, fumaric acid, citraconic acid, citraconic anhydride, mesaconic acid, itaconic acid, itaconic anhydride, aconitic acid, aconitic anhydride, and hymic anhydride, and derivatives of these compounds. Examples of the derivatives include compounds having at least one (meth)acryloyl group in the molecule of methyl (meth)acrylate, ethyl (meth)acrylate, and the like. The term (meth)acrylic means acrylic or methacrylic. This is applicable to (meth)acrylate and (meth)acryloyl. The acid compound is preferably a compound having an acid group.

The degree of acid modification (e.g., graft weight) in the acid-modified polypropylene resin is, for example, 1 to 20% by mass. The degree of acid modification in the acid-modified polypropylene resin may be 1% by mass or more or 3% by mass or more, and may be 20% by mass or less or 10% by mass or less. The degree of acid modification and the graft weight can be determined by alkalimetry or Fourier transform infrared spectroscopy.

An example of the method of acid modification is graft modification of polypropylene. Specific examples include a method in which polypropylene is heated and melted to the melting point or higher to react in the presence of a radical reaction initiator (melting method), and a method in which polypropylene is dissolved in an organic solvent and then heated and stirred in the presence of a radical reaction initiator to react (solution method). Examples of the radial reaction initiator include organic peroxide compounds and azonitriles.

The acid-modified polypropylene resin may be chlorinated. A chlorination reaction can be performed by conventionally known methods.

The weight average molecular weight of the acid-modified polypropylene resin is, for example, 10,000 to 200,000. The weight average molecular weight of the acid-modified polypropylene resin may be 10,000 or more, 15,000 or more, or 40,000 or more, and may be 200,000 or less, 150,000 or less, or 120,000 or less. The weight average molecular weight is the value measured by gel permeation chromatography (standard material: polystyrene).

The melting point ($Tm_1$) of the acid-modified polypropylene resin is, for example, 50 to 150° C. When the melting point ($Tm_1$) of the acid-modified polypropylene resin is in this range, more excellent setting properties and image fastness tend to be achieved. The melting point ($Tm_1$) of the acid-modified polypropylene resin is preferably lower than the melting point of the oxidized polyethylene wax. The melting point ($Tm_1$) is the value measured by a melting point measuring device in compliance with JIS K 0064.

The acid-modified polypropylene resin is, for example, in the particulate form. The average particle size of the particulate acid-modified polypropylene resin is, for example, 10 to 200 nm in terms of preventing clogging of inkjet heads.

The average particle size of the particulate acid-modified polypropylene resin may be 10 nm or more or 20 nm or more, and may be 200 nm or less or 170 nm or less. The average particle size is the d50 diameter in the volume-based particle size distribution as measured by a laser scattering method using a laser scattering particle size analyzer (e.g., Microtrac).

The acid-modified polypropylene resin is preferably used in a dissolved or dispersed state in a solvent and more preferably used in a state of emulsion dispersed in a solvent. The solvent is preferably an aqueous medium and more preferably the same aqueous medium as the aqueous medium used in the solvent of the aqueous ink composition. When such a dispersion is used, the pH of the dispersion is, for example, 6 to 10 at a liquid temperature of 25° C. in terms of facilitating dispersion of the acid-modified polypropylene resin in the solvent and improving storage stability. To keep the pH in this range, the dispersion may contain an amine neutralizer such as ammonia water, triethylamine, triethanolamine, dimethylaminoethanol, or morpholine, or an inorganic base such as sodium hydroxide or potassium hydroxide.

The acid-modified polypropylene resin can be used singly or in combination of two or more.

A commercially available product can be used as the acid-modified polypropylene resin. Examples of preferred commercially available products include AUROREN (registered trademark) AE-301 and AE-502 from Nippon Paper Industries Co., Ltd.

The amount of the acid-modified polypropylene resin is preferably 3% by mass or less and may be 2.5% by mass or less or 2% by mass or less of the total amount of the aqueous ink composition, in terms of suppressing the occurrence of mottling and white streaks in printing on a less-ink-absorbent or non-ink-absorbent recording medium. The amount of the acid-modified polypropylene resin is preferably 0.5% by mass or more and may be 0.75% by mass or more or 1% by mass or more of the total amount of the aqueous ink composition, in terms of achieving more excellent setting properties. In these respects, the amount of the acid-modified polypropylene resin is preferably 0.5 to 3% by mass of the total amount of the aqueous ink composition.

The amount of the acid-modified polypropylene resin is preferably 300 parts by mass or less and may be 150 parts by mass or less or 100 parts by mass or less per 100 parts by mass of the color material, in terms of suppressing the occurrence of mottling and white streaks in printing on a less-ink-absorbent or non-ink-absorbent recording medium. The amount of the acid-modified polypropylene resin is preferably 8 parts by mass or more and may be 12 parts by mass or more or 16 parts by mass or more per 100 parts by mass of the color material, in terms of achieving more excellent setting properties. In these respects, the amount of the acid-modified polypropylene resin is preferably 8 to 300 parts by mass per 100 parts by mass of the color material.

Although the aqueous ink composition may contain a resin other than the acid-modified polypropylene resin as the binder resin, the amount of the acid-modified polypropylene resin per 100 parts by mass of the total binder resin is preferably 80 parts by mass or more and may be 90 parts by mass or more, 95 parts by mass or more, or 100 parts by mass.

[Oxidized Polyethylene Wax]

The oxidized polyethylene wax is made by oxidation of polyethylene wax and has a polyethylene-derived backbone (polyethylene backbone). The polyethylene backbone has a structural unit mainly derived from ethylene.

The polyethylene backbone may be a homopolyethylene (a monopolymer of ethylene) backbone, may be a block polyethylene (a block copolymer of ethylene and another olefin) backbone, or may be a random polyethylene (a random copolymer of ethylene and another olefin) backbone. Examples of the other olefin include alkenes such as propylene, isobutylene, 1-butene, 1-pentene, and 1-hexene. These components may be linear or branched. The carbon number of the other olefin component is, for example, 2 to 6.

The amount of the ethylene component (the amount of the structural unit derived from ethylene) in the polyethylene backbone is, for example, 60 mol % or more, and may be 70 mol % or more. When the polyethylene backbone is a block polyethylene backbone or a random polyethylene backbone, the amount of the ethylene component (the amount of the structural unit derived from ethylene) in the polyethylene backbone is, for example, 95 mol % or less, and may be 90 mol % or less.

The amount of the polyethylene backbone in the oxidized polyethylene wax is, for example, 50 to 99% by mass of the total amount of the oxidized polyethylene wax. The amount of the polyethylene backbone in the oxidized polyethylene wax may be 50% by mass or more, 60% by mass or more, or 70% by mass or more, and may be 99% by mass or less, 95% by mass or less, or 90% by mass or less of the total amount of the oxidized polyethylene wax.

The oxidized polyethylene wax preferably includes high-density oxidized polyethylene wax in terms of achieving more excellent image fastness. In the present embodiment, by the synergistic effect of using the acid-modified polypropylene resin and the high-density oxidized polyethylene wax in combination, more excellent setting properties and image fastness and more excellent mottling-suppressing effect tend to be achieved. The density of the high-density oxidized polyethylene wax is, for example, 0.95 g/cm$^3$ or higher and may be 0.95 to 1.1 g/cm$^3$.

The melting point ($Tm_2$) of the oxidized polyethylene wax is, for example, 160° C. or lower, preferably 140° C. or lower, and may be 135° C. or lower or 130° C. or lower. The melting point ($Tm_2$) of the oxidized polyethylene wax is, for example, 40° C. or higher, preferably 120° C. or higher, and more preferably 125° C. or higher. The melting point ($Tm_2$) is the value measured by a melting point measuring device in compliance with JIS K 0064.

The oxidized polyethylene wax is, for example, in the particulate form. The average particle size of the particulate oxidized polyethylene wax is, for example, 10 to 200 nm in terms of preventing clogging of inkjet heads. The average particle size of the particulate oxidized polyethylene wax may be 20 nm or more or 30 nm or more, and may be 100 nm or less or 60 nm or less. The average particle size is the d50 diameter in the volume-based particle size distribution as measured by a laser scattering method using a laser scattering particle size analyzer (e.g., Microtrac).

The oxidized polyethylene wax is preferably used in a dissolved or dispersed state in a solvent and more preferably used in a state of emulsion dispersed in a solvent. The solvent is preferably an aqueous medium and more preferably the same aqueous medium as the aqueous medium used in the solvent of the aqueous ink composition.

The oxidized polyethylene wax can be used singly or in combination of two or more.

A commercially available product can be used as the oxidized polyethylene wax. Examples of preferred commercially available products include AQUACER 515 and AQUACER 1547 available from BYK-Chemie GmbH.

The amount of the oxidized polyethylene wax is preferably 0.1% by mass or more, and may be 0.2% by mass or more or 0.3% by mass or more of the total amount of the aqueous ink composition in terms of excellent image fastness. The amount of the oxidized polyethylene wax is, for example, 5% by mass or less, and may be 3% by mass or less or 2% by mass or less of the total amount of the aqueous ink composition, in terms of easily achieving sufficient ejection stability. In these respects, the amount of the oxidized polyethylene wax may be 0.1 to 5% by mass of the total amount of the aqueous ink composition.

The amount of the oxidized polyethylene wax is preferably 1.6 parts by mass or more, and may be 4 parts by mass or more or 6 parts by mass or more per 100 parts by mass of the color material in terms of excellent image fastness. The amount of the oxidized polyethylene wax is, for example, 500 parts by mass or less, and may be 350 parts by mass or less or 200 parts by mass or less per 100 parts by mass of the color material, in terms of easily achieving sufficient ejection stability. In these respects, the amount of the oxidized polyethylene wax may be 1.6 to 500 parts by mass per 100 parts by mass of the color material.

The ratio of the amount of the oxidized polyethylene wax to the amount of the acid-modified polypropylene resin (the amount of the oxidized polyethylene wax/the amount of the acid-modified polypropylene resin) is, for example, 0.03 to 10 in terms of more excellent setting properties and image fastness and suppressing mottling more. The ratio may be 0.03 or more, 0.1 or more, 0.2 or more, or 0.3 or more, and may be 10 or less, 2.0 or less, or 1.5 or less. In the present embodiment, in particular, the ratio of the amount of the oxidized polyethylene wax to the amount of the high-density acid-modified polypropylene resin is preferably in the above range.

The aqueous ink composition may contain a wax other than the oxidized polyethylene wax as the wax. However, the amount of the oxidized polyethylene wax per 100 parts by mass of the total wax is preferably 80 parts by mass or more, and may be 90 parts by mass or more, 95 parts by mass or more, or 100 parts by mass.

Other Components

In addition to the components described above, the aqueous ink composition may further include other additives such as a surfactant, a pigment dispersant, a wetting agent (drying retarder), a penetrating agent, a preservative, a viscosity adjuster, a pH adjuster, a chelating agent, a plasticizer, an antioxidant, and a UV absorber, if necessary.

The use of a surfactant facilitates prevention of the occurrence of streaky print defects, for example, because the droplets of the aqueous ink composition ejected from the ejection holes of inkjet heads spread on a surface well after landing on a material to be printed. Furthermore, the use of a surfactant can reduce the surface tension of the aqueous ink composition, for example, thereby improving the leveling properties of the aqueous ink composition.

Examples of the surfactant that can be used include anionic surfactants, nonionic surfactants, cationic surfactants, and amphoteric surfactants. The surfactant is preferably one or more selected from the group consisting of anionic surfactants and nonionic surfactants in terms of easily suppressing the occurrence of streaky print detects.

Examples of the anionic surfactants include alkyl benzene sulfonates, alkyl phenyl sulfonates, alkyl naphthalene sulfonates, higher fatty acid salts, sulfates of higher fatty acid esters, sulfonates of higher fatty acid esters, sulfates and sulfonates of higher alcohol ethers, higher alkyl sulfosuccinates, polyoxyethylene alkyl ether carboxylates, polyoxyethylene alkyl ether sulfates, alkyl phosphates, and polyoxyethylene alkyl ether phosphates. Specific examples of these include dodecyl benzene sulfonates, isopropylnaphthalene sulfonates, monobutylphenylphenol monosulfonates, monobutylbiphenyl sulfonates, and dibutylphenylphenol disulfonates.

Examples of the nonionic surfactants include polyoxyethylene alkyl ethers, polyoxyethylene alkyl phenyl ethers, polyoxyethylene fatty acid esters, sorbitan fatty acid esters, polyoxyethylene sorbitan fatty acid esters, polyoxyethylene sorbitol fatty acid esters, glycerol fatty acid esters, polyoxyethylene glycerol fatty acid esters, polyglycerol fatty acid esters, sucrose fatty acid esters, polyoxyethylene alkylamines, polyoxyethylene fatty acid amides, fatty acid alkylolamides, alkyl alkanolamides, acetylene glycols, oxyethylene adducts of acetylene glycols, and polyethylene glycol-polypropylene glycol block copolymers. Among these, one or more selected from the group consisting of polyoxyethylene nonylphenyl ethers, polyoxyethylene octylphenyl ethers, polyoxyethylene dodecylphenyl ethers, polyoxyethylene alkyl ethers, polyoxyethylene fatty acid esters, sorbitan fatty acid esters, polyoxyethylene sorbitan fatty acid esters, fatty acid alkylolamides, acetylene glycols, oxyethylene adducts of acetylene glycols, and polyethylene glycol-polypropylene glycol block copolymers are preferred.

Preferably, the aqueous ink composition contains an acetylene-based surfactant in terms of easily suppressing the occurrence of streaky print detects. The acetylene-based surfactant is a surfactant having an acetylene structure in the molecule. The acetylene-based surfactant preferably includes one or more selected from the group consisting of acetylene glycols and oxyethylene adducts of acetylene glycols in terms of easily suppressing the occurrence of streaky print defects.

The amount of the acetylene-based surfactant is preferably 80 to 100% by mass, more preferably 85 to 99.9% by mass, even more preferably 90 to 99.5% by mass, and particularly preferably 95 to 99.3% by mass of the total amount of the surfactant, in terms of easily suppressing the occurrence of streaky print detects.

Examples of other surfactants that can be used include silicone surfactants such as polysiloxane oxyethylene adducts; fluorosurfactants such as perfluoroalkyl carboxylates, perfluoroalkyl sulfonates, and oxyethylene perfluoroalkyl ethers; and biosurfactants such as spiculisporic acid, rhamnolipid, and lysolecithin.

The amount of the surfactant is preferably 0.001 to 5% by mass, more preferably 0.001 to 3% by mass, even more preferably 0.001 to 2% by mass, particularly preferably 0.01 to 2% by mass, extremely preferably 0.1 to 2% by mass, very preferably 0.5 to 2% by mass, further more preferably 0.8 to 2% by mass, and even more preferably 1 to 1.6% by mass of the total amount of the aqueous ink composition. The ejected droplets of the aqueous ink composition containing a surfactant in such an amount have high wettability of a surface of a material to be printed and sufficiently spread over the material to be printed, thereby easily achieving the effect of preventing the occurrence of streaky print defects. Furthermore, the aqueous ink composition containing a surfactant in the above ranges easily improves the leveling properties of the coating. In this respect, the amount of the acetylene-based surfactant is preferably within the above ranges.

The pigment dispersant can be suitably used when a pigment is used as the color material. Examples of the pigment dispersant that can be used include polyvinyl alcohols, polyvinyl pyrrolidones, acrylic resins such as acrylic acid-acrylic ester copolymers, styrene-acrylic resins such as styrene-acrylic acid copolymers, styrene-methacrylic acid copolymers, styrene-methacrylic acid-acrylic ester copolymers, styrene-α-methylstyrene-acrylic acid copolymers, and styrene-α-methylstyrene-acrylic acid-acrylic acid ester copolymers, aqueous resins such as styrene-maleic acid copolymers, styrene-maleic anhydride copolymers, and vinylnaphthalene-acrylic acid copolymers, and salts of the aqueous resins. AJISPER PB series available from Ajinomoto Fine Techno Co., Inc., DISPERBYK series available from BYK Japan KK, EFKA series available from BASF SE, Solsperse series available from Lubrizol Japan Limited, TEGO series available from Evonik Industries AG, and the like can be used as the pigment dispersant. The compounds listed as the polymer (G) in WO2018/190139 can also be used as the pigment dispersant.

The wetting agent can be used for preventing the aqueous ink composition from drying at the ejection nozzles of inkjet heads. The wetting agent is preferably the one that is miscible with water and can prevent clogging of ejection holes of inkjet heads. Examples include ethylene glycol, diethylene glycol, triethylene glycol, polyethylene glycol with a molecular weight of 2000 or less, propylene glycol, dipropylene glycol, tripropylene glycol, isopropylene glycol, isobutylene glycol, 1,4-butanediol, 1,3-butanediol, 1,5-pentanediol, 1,6-hexanediol, meso-erythritol, pentaerythritol, and glycerol.

A solid wetting agent can also be used as the wetting agent. Examples of such a wetting agent include urea and urea derivatives. Examples of the urea derivatives include ethylene urea, propylene urea, diethyl urea, thiourea, N,N-dimethyl urea, hydroxyethyl urea, hydroxybutyl urea, ethylenethiourea, and diethylthiourea. These can be used singly or in combination of two or more. Preferably, at least one selected from the group consisting of urea, ethylene urea, and 2-hydroxyethyl urea is used in terms of easily producing a printed material with excellent setting properties.

The amount of the wetting agent may be 3 to 50% by mass of the total amount of the aqueous ink composition.

Examples of the penetrating agent include lower alcohols such as ethanol and isopropyl alcohol; and glycol monoethers such as ethylene glycol monomethyl ether, ethylene glycol monoethyl ether, ethylene glycol monopropyl ether, ethylene glycol monobutyl ether, diethylene glycol monomethyl butyl ether, diethylene glycol monoethyl ether, diethylene glycol monopropyl ether, diethylene glycol monobutyl ether, triethylene glycol monomethyl ether, triethylene glycol monoethyl ether, triethylene glycol monopropyl ether, triethylene glycol monobutyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, tripropylene glycol monomethyl ether, tripropylene glycol monoethyl ether, tripropylene glycol monopropyl ether, and tripropylene glycol monobutyl ether. The amount of the penetrating agent is preferably 3% by mass or less, more preferably 1% by mass or less of the total amount of the aqueous ink composition, and even more preferably, the aqueous ink composition contains substantially no penetrating agent.

The pH of the aqueous ink composition is preferably 7.0 or higher, more preferably 7.5 or higher, and even more preferably 8.0 or higher in order to improve storage stability and ejection stability of the ink, and to improve wetting, printing density, and abrasion resistance in printing on a less-ink-absorbent or non-ink-absorbent recording medium. The upper limit of pH of the aqueous ink composition is preferably 11.0 or lower, more preferably 10.5 or lower, and even more preferably 10.0 or lower, in order to suppress deterioration of members of an ink-applying or ejecting device (e.g., ink ejection holes, ink channels, etc.) and to reduce the effect of ink adhering to the skin. In these respects, the pH of the aqueous ink composition is preferably 7.0 to 11.0. The above pH is the pH at 25° C.

The viscosity of the aqueous ink composition is, for example, 2 mPa·s or higher and lower than 10 mPa·s at 32° C. When the aqueous ink composition having a viscosity within this range is used in the inkjet recording method, the displacement of ink droplets landing on a recording medium due to flight deflection is alleviated in appearance, and the occurrence of streaks on a printed material tends to be prevented effectively. The aqueous ink composition having a viscosity in this range tends to be excellent in storage stability and ejection stability in the inkjet recording method. The viscosity of the aqueous ink composition at 32° C. is preferably 3 mPa·s or higher and more preferably 4 mPa·s or higher. The viscosity of the aqueous ink composition at 32° C. is preferably 8 mPa·s or lower and more preferably 7 mPa·s or lower. The viscosity is the value measured, for example, using a cone-and-plate rotational viscometer equivalent to an E-type viscometer, under the following conditions.

Measuring device: TVE-25 viscometer (TVE-25 L available from Toki Sangyo Co., Ltd.)
Standard liquid for calibration: JS20
Measuring temperature: 32° C.
Rotation speed: 10 to 100 rpm
Injection volume: 1200 μL The surface tension of the aqueous ink composition is, for example, 20 to 40 mN/m at 25° C. When the aqueous ink composition having a surface tension within this range is used in the inkjet recording method, the wettability of the ejected droplets with the surface of a recording medium tends to be high, and the droplets tend to sufficiently spread after landing. The surface tension of the aqueous ink composition at 25° C. is preferably 25 mN/m or higher and more preferably 27 mN/m or higher. The surface tension of the aqueous ink composition at 25° C. is preferably 35 mN/m or lower and more preferably 32 mN/m or lower.

The aqueous ink composition in an embodiment described above can be produced by mixing the components listed above. The components listed above may be mixed in a batch or may be mixed sequentially. For example, the binder resin (e.g., the acid-modified polypropylene resin) and the wax (e.g., the oxidized polyethylene wax) may be dissolved or dispersed in an aqueous medium before mixing.

The pigment may be dispersed in an aqueous medium together with a pigment dispersant before mixing. For mixing, a disperser such as a beads mill, an ultrasonic homogenizer, a high-pressure homogenizer, a paint shaker, a ball mill, a roll mill, a sand mill, a sand grinder, Dyno-Mill, DISPERMAT, SC mill, or Nano-Mizer can be used. After mixing, centrifugation, filtration, and the like may be performed if necessary.

(Printed Material and Method of Producing the Same)

A printed material in an embodiment is a printed material made by printing the aqueous ink composition in the foregoing embodiment on a surface of a recording medium. This printed material has a recording medium and an ink coating printed on a surface of the recording medium. The ink coating formed on the surface of the recording medium is, for example, a dried product of the aqueous ink composition and contains the solid contents in the aqueous ink composition in the foregoing embodiment (e.g., the color material, the acid-modified polypropylene resin, and the oxidized polyethylene wax). The recording medium is, for example, the less-ink-absorbent or non-ink-absorbent recording medium described above. This printed material has sufficient image fastness even when the recording medium is the less-ink-absorbent or non-ink-absorbent medium described above.

The printed material is produced, for example, by printing the aqueous ink composition in the foregoing embodiment on a surface of a recording medium by the inkjet recording method. Specifically, the printed material can be produced by ejecting and printing the aqueous ink composition on a recording medium by the inkjet recording method in which the distance from a surface (x) having ink ejection holes of an inkjet head to a position (y) where a normal to the surface (x) intersects the recording medium is 1 mm or more.

EXAMPLES

The invention will be described in more detail below with examples, but the invention is not limited to these examples.

<Preparation of Resin Dispersion>

Preparation Example 1-1

A homopolypropylene resin (propylene component 100 mol %, weight average molecular weight 90,000) was produced using a metallocene catalyst as a polymerization catalyst.

Subsequently, 100 parts by mass of the resulting homopolypropylene resin, 2 parts by mass of maleic anhydride, 1.5 parts by mass of methyl methacrylate, and 1.5 parts by mass of di-t-butyl peroxide were blended and allowed to react using a twin-screw extruder set at a barrel temperature of 170° C. The extruder was degassed under a reduced pressure to remove any residual unreacted material, yielding an acid-modified polypropylene resin A. The resulting acid-modified polypropylene resin A had a weight average molecular weight of 77,000, the graft weight of maleic anhydride was 1.7% by mass, the graft weight of methyl methacrylate was 1.3% by mass, and the melting point $(Tm_1)$ was 90° C.

In a four-necked flask equipped with a stirrer, a condenser, a thermometer, and a funnel, 100 g of the resulting acid-modified polypropylene resin A, 20 g of polyoxyethylene lauryl ether (surfactant), 10 g of 2-methyl-2-amino-1-propanol (neutralizer), and 20 g of toluene (solvent) were added and blended at 120° C. for 30 minutes. Then, 290 g of deionized water at 90° C. was added over 90 minutes. Subsequently, the solvent was removed under a reduced pressure, and then the mixture was cooled to room temperature while being stirred, yielding a dispersion of the acid-modified polypropylene resin A (resin dispersion 1). The resulting resin dispersion 1 had an average particle size of 120 nm and a pH of 8.5. The concentration of the acid-modified polypropylene resin in the resin dispersion 1 was adjusted to 30% by mass.

Preparation Example 1-2

A random polypropylene resin (propylene component 75 mol %, ethylene component 5 mol %, butene component 20 mol %, weight average molecular weight 65,000) was produced using a Ziegler-Natta catalyst as a polymerization catalyst.

Subsequently, 100 parts by mass of the resulting random polypropylene resin, 6 parts by mass of maleic anhydride, 3 parts by mass of ethyl methacrylate, and 1.5 parts by mass of di-t-butyl peroxide were blended and allowed to react using a twin-screw extruder set at a barrel temperature of 160° C. The extruder was degassed under a reduced pressure to remove any residual unreacted material, yielding an acid-modified polypropylene resin B. The resulting acid-modified polypropylene resin B had a weight average molecular weight of 55,000, the graft weight of maleic anhydride was 5.2% by mass, the graft weight of di-t-butyl peroxide was 1.3% by mass, and the melting point $(Tm_1)$ was 70° C.

In a four-necked flask equipped with a stirrer, a condenser, a thermometer, and a funnel, 100 g of the resulting acid-modified polypropylene resin B, 20 g of polyoxyethylene alkyl amine (surfactant), 18 g of 25% ammonia water (neutralizer), and 18 g of methylcyclohexane (solvent) were added and blended at 120° C. for 30 minutes. Then, 290 g of deionized water at 90° C. was added over 90 minutes. Subsequently, the solvent was removed under a reduced pressure, and then the mixture was cooled to room temperature while being stirred, yielding a dispersion of the acid-modified polypropylene resin B (resin dispersion 2). The resulting resin dispersion 2 had an average particle size of 163 nm and a pH of 8.3. The concentration of the acid-modified polypropylene resin in the resin dispersion 2 was adjusted to 30% by mass.

Preparation Example 1-3

A dispersion of the acid-modified polypropylene resin B (resin dispersion 3) was produced in the same way as in Preparation Example 1-1, except that the acid-modified polypropylene resin B produced in Preparation Example 1-2 was used with morpholine as a neutralizer. The resulting resin dispersion 3 had an average particle size of 151 nm and a pH of 9.0. The concentration of the acid-modified polypropylene resin in the resin dispersion 3 was adjusted to 30% by mass.

<Preparation of Pigment Dispersion>

Preparation Example 2-1

Carbon black "#960" (product name) from Mitsubishi Chemical Corporation was used as a black pigment, and a pigment dispersion K (pigment concentration: 20% by mass) was prepared by the following method. First, 150 g of the black pigment, 60 g of a pigment dispersant, 75 g of propylene glycol, and 19.4 g of a 34% by mass potassium hydroxide solution were charged in a 1.0 L intensive mixer (available from Nippon Eirich Co., Ltd.) and blended for 25 minutes at a rotor peripheral speed of 2.94 m/s and a pan peripheral speed of 1 m/s. Subsequently, 306 g of ion-exchange water was gradually added to the mixture in the vessel of the intensive mixer with continuous stirring, and then 12 g of propylene glycol and 127.5 g of ion-exchange water were further added so that the pigment concentration became 20% by mass, yielding an aqueous pigment dispersion (pigment dispersion K) with a pigment concentration of 20% by mass. The pigment dispersant used was the polymer (P-1) prepared according to Synthesis Example 1 in WO2018/190139.

Preparation Example 2-2

"FASTOGEN BLUE SBG-SD" (product name) from DIC Corporation was prepared as a cyan pigment, and a pigment dispersion C (pigment concentration: 20% by mass) was prepared in the same way as in Preparation Example 2-1, except that the cyan pigment was used instead of the black pigment.

Preparation Example 2-3

"FASTOGEN SUPER MAGENTA RY" (product name) from DIC Corporation was prepared as a magenta pigment, and a pigment dispersion M (pigment concentration: 20% by mass) was prepared in the same way as in Preparation Example 2-1, except that the magenta pigment was used instead of the black pigment.

Preparation Example 2-4

"FAST YELLOW 7413" (product name) from SANYO COLOR WORKS, Ltd. was prepared as a yellow pigment, and a pigment dispersion Y (pigment concentration: 20% by mass) was prepared in the same way as in Preparation Example 2-1, except that the yellow pigment was used instead of the black pigment.

<Preparation of Wax>

The following oxidized polyethylene waxes were prepared as the wax.
AQUACER515: available from BYK-Chemie GmbH, product name, high-density oxidized polyethylene wax emulsion, melting point ($Tm_2$) 135° C.
AQUACER1547: available from BYK-Chemie GmbH, product name, high-density oxidized polyethylene wax emulsion, melting point ($Tm_2$) 125° C.

<Preparation of Aqueous Ink Composition>

Examples 1 to 15

The pigment dispersions and the resin dispersions produced as described above were used, and the pigment dispersion, the resin dispersion, and the wax listed in Tables 1 and 2, propylene glycol, glycerol, triethanolamine, TEGO Wet 280 (from Evonik Industries AG, silicone surfactant), ACTICIDE B20 (from Thor Japan, preservative), ethylene urea, SURFYNOL 420 (from Evonik Industries AG, acetylene-based surfactant), and distilled water were mixed and stirred to yield aqueous ink compositions of Examples 1 to 15. The amount of the pigment dispersion was adjusted for each pigment. Specifically, the amount of the pigment dispersion was 28% by mass (pigment: 5.6% by mass) for the pigment dispersion K, 22% by mass (pigment: 4.3% by mass) for the pigment dispersion C, 30% by mass (pigment: 6.0% by mass) for the pigment dispersion M, and 17% by mass (pigment: 3.3% by mass) for the pigment dispersion Y. The amount of the resin dispersion was adjusted so that the resin content was the value listed in Tables 1 and 2. The amount of the wax was 1.0% by mass. The amount of propylene glycol was 7 to 26% by mass so that the viscosity (32° C.) of the aqueous ink composition was 4.8 Pa·s. The amounts of glycerol, triethanolamine, TEGO Wet 280, ACTICIDE B20, ethylene urea, and SURFYNOL 420 were 12.0% by mass, 0.2% by mass, 0.1% by mass, 0.1% by mass, 5.62% by mass, and 1.00% by mass, respectively. The distilled water was added so that the total amount of the added components was 100% by mass. All of the amounts above are based on the total amount of the aqueous ink composition.

Comparative Examples 1 to 4

As indicated in Table 3, the aqueous ink compositions of Comparative Examples 1 and 4 were produced in the same way as in Examples, except that a resin dispersion or a wax was not used.

<Characteristics Evaluation>

The characteristics (setting properties, image fastness, mottling, white streaks, and storage stability) of the aqueous ink compositions (aqueous inkjet inks) of the examples and the comparative examples were evaluated by the method described below, and the evaluation results in Tables 1 to 3 were obtained.

[Setting Properties Evaluation]

The aqueous ink compositions of the examples and the comparative examples were each charged in an inkjet head KJ4B-YH from KYOCERA Corporation, and 100% solid printing was performed on OK TopKote+ (from Oji Paper Co., Ltd., basis weight 104.7 g/m²) (base material), which was a less-ink-absorbent recording medium, to produce a coating of the aqueous ink composition. The supply pressure in printing was adjusted by setting the hydraulic head difference of the ink sub-tank from the head nozzle plate surface to +35 cm and the negative pressure to −5.0 kPa. The minimum distance between the ink ejection holes of the inkjet head and the recording medium (the distance (gap) from the surface (x) having ink ejection holes of the inkjet head to a position (y) where a normal to the surface (x) intersects the recording medium) was set to 1 mm. The driving conditions of the head include the standard voltage and the standard temperature of inkjet heads, and the droplet size was set to 18 pL.

The coating immediately after printing was dried for one second with a 9 kW near-infrared heater at a distance of approximately 8 cm from the base material, and the coating was rubbed with a cotton swab 10 seconds and 60 seconds after the start of drying. The degree of peeling of the coating was visually observed, and the setting properties were evaluated based on the following criteria.
   5: No peeling of the coating after 10 seconds, and the cotton swab is not stained.
   4: No visible peeling of the coating after 10 seconds, but the cotton swab is stained.
   3: No peeling of the coating after 60 seconds, and the cotton swab is not stained (visible peeling of the coating after 10 seconds).
   2: No visible peeling of the coating after 60 seconds, but the cotton swab is stained (visible peeling of the coating after 10 seconds).
   1: Peeling of the coating even after 60 seconds.

[Image Fastness Evaluation]

100% solid printing was performed in the same way as in the evaluation of setting properties, and a coating of the aqueous ink composition was obtained. The resulting coating was dried at room temperature (25° C.) for 12 hours (overnight). Subsequently, the dried coating was rubbed 200 times with a load of 100 g/cm$^2$ using a Gakushin-type rubbing tester RT-300 (from DAIEI KAGAKU SEIKI MFG., CO., LTD.) with the same paper as the print base material as the rubbing finger. The degree of peeling of the coating was visually observed, and image fastness was evaluated based on the following criteria.
  5: No scratches on the printed material, and no coloration was found on the rubbing paper.
  4: Slight scratches on the printed material, and slight light coloration was also found on the rubbing paper.
  3: Slight scratches on the printed material, and partial dark coloration was found on the rubbing paper.
  2: Many scratches on the printed material, and partial dark coloration was found on the rubbing paper.
  1: Many scratches on the printed material, and dark coloration was found over the entire surface of the rubbing paper.

[Mottling Evaluation]

100% solid printing was performed in the same way as in the evaluation of setting properties, and a coating of the aqueous ink composition was obtained. The resulting coating was dried for one second with a 9 kW near-infrared heater at a distance of approximately 8 cm from the base material. The dried coating was scanned with a scanner and the scanned image was numerically analyzed using image analysis software "ImageJ". The image was binarized in 8 bits, and the value (solid image quality) serving as an index of grayscale of the image was calculated. The upper limit of the value of the solid image quality was 100, and a value closer to 100 indicated a satisfactory coating free from mottling. The image was evaluated on a 5-point scale according to the value of the solid image quality.
  5: Solid image quality is 90 or more and 100 or less
  4: Solid image quality is 75 or more and less than 90
  3: Solid image quality is 50 or more and less than 75
  2: Solid image quality is 40 or more and less than 50
  1: Solid image quality is less than 40

[White Streaks Evaluation]

100% solid printing was performed in the same way as in the evaluation of setting properties, and a coating of the aqueous ink composition was obtained. The resulting coating was dried for one second with a 9 kW near-infrared heater at a distance of approximately 8 cm from the base material. The dried coating was scanned with a scanner, and the percentage of portions not coated with ink (streaks ratio) was calculated using image analysis software "ImageJ". The streaks ratio is the percentage of the area not coated with the aqueous ink to the area in which 100% solid printing was performed.
  5: Streaks ratio of the printed material is less than 1%.
  4: Streaks ratio of the printed material is 1% or more and less than 3%.
  3: Streaks ratio of the printed material is 3% or more and less than 5%.
  2: Streaks ratio of the printed material is 5% or more and less than 10%.
  1: Streaks ratio of the printed material is 10% or more.

[Storage Stability Evaluation]

The aqueous ink compositions of the examples and the comparative examples were charged into plastic bottles and stored in a thermostatic bath at 60° C. for four weeks, and the ratio of change in viscosity of the aqueous ink compositions before and after standing still in the thermostatic bath was determined. Subsequently, the storage stability of the aqueous ink compositions was evaluated based on the following criteria. The ratio of change in viscosity is the value calculated by [(the viscosity of ink before standing still−the viscosity of ink after standing still)/(the viscosity of ink before standing still)]×100.
  5: The ratio of change from the initial value is within ±5%.
  4: The ratio of change from the initial value is over ±5% to within ±10%.
  3: The ratio of change from the initial value is over ±10% to within ±20%.
  2: The ratio of change from the initial value is over ±20%.
  1: Ink fails to be produced due to gelation or agglomeration at the time of making ink.

The viscosity of the ink was measured using a cone-and-plate rotational viscometer equivalent to an E-type viscometer, under the following conditions.
  Measuring device: TVE-25 viscometer (TVE-25 L available from Toki Sangyo Co., Ltd.)
  Standard liquid for calibration: JS20
  Measuring temperature: 32° C.
  Rotation speed: 10 to 100 rpm
  Injection volume: 1200 µL

TABLE 1

|  |  | Example 1 | Example 2 | Example 3 | Example 4 | Example 5 | Example 6 | Example 7 | Example 8 |
|---|---|---|---|---|---|---|---|---|---|
| Kind of pigment dispersion | | K | K | K | K | K | K | K | K |
| Kind of resin dispersion | | 1 | 2 | 3 | 1 | 2 | 3 | 3 | 3 |
| Acid-modified polypropylene resin A (% by mass) | | 1.0 | — | — | 1.0 | — | — | — | — |
| Acid-modified polypropylene resin B (% by mass) | | — | 1.0 | 1.0 | — | 1.0 | 1.0 | 3.0 | 6.0 |
| AQUACER515 (% by mass) | | 1.0 | 1.0 | 1.0 | — | — | — | — | 1.0 |
| AQUACER1547 (% by mass) | | — | — | — | 1.0 | 1.0 | 1.0 | 1.0 | — |
| Evaluation | Setting properties | 4 | 4 | 4 | 4 | 4 | 4 | 5 | 5 |
| | Image fastness | 4 | 4 | 4 | 4 | 4 | 4 | 5 | 5 |
| | Mottling | 5 | 5 | 5 | 5 | 5 | 5 | 4 | 1 |
| | White streaks | 5 | 5 | 5 | 5 | 5 | 5 | 4 | 1 |
| | Storage stability | 4 | 4 | 4 | 5 | 5 | 5 | 4 | 2 |

TABLE 2

|  |  | Example 9 | Example 10 | Example 11 | Example 12 | Example 13 | Example 14 | Example 15 |
|---|---|---|---|---|---|---|---|---|
| Kind of pigment dispersion | | C | C | C | C | C | M | Y |
| Kind of resin dispersion | | 3 | 3 | 3 | 3 | 3 | 3 | 3 |
| Acid-modified polypropylene resin B (% by mass) | | 1.0 | 3.0 | 4.0 | 5.0 | 6.0 | 1.0 | 1.0 |
| AQUACER515 (% by mass) | | 1.0 | 1.0 | 1.0 | 1.0 | 1.0 | 1.0 | 1.0 |
| Evaluation | Setting properties | 4 | 5 | 5 | 5 | 5 | 4 | 4 |
|  | Image fastness | 4 | 5 | 5 | 5 | 5 | 4 | 4 |
|  | Mottling | 5 | 4 | 3 | 2 | 1 | 5 | 5 |
|  | White streaks | 5 | 4 | 3 | 2 | 1 | 5 | 5 |
|  | Storage stability | 5 | 5 | 4 | 3 | 2 | 4 | 5 |

TABLE 3

|  |  | Comparative Example 1 | Comparative Example 2 | Comparative Example 3 | Comparative Example 4 |
|---|---|---|---|---|---|
| Kind of pigment dispersion | | C | C | K | K |
| Kind of resin dispersion | | 3 | — | 3 | — |
| Acid-modified polypropylene resin B (% by mass) | | 1.0 | — | 1.0 | — |
| AQUACER515 (% by mass) | | — | 1.0 | — | 1.0 |
| Evaluation | Setting properties | 4 | 2 | 5 | 2 |
|  | Image fastness | 5 | 2 | 5 | 2 |
|  | Mottling | 5 | 2 | 5 | 2 |
|  | White streaks | 5 | 5 | 5 | 5 |
|  | Storage stability | 5 | 5 | 5 | 5 |

The invention claimed is:

1. An aqueous ink composition for use in an inkjet recording method, the aqueous ink composition comprising:
a color material;
an aqueous medium;
a binder resin;
a surfactant; and
a wax, wherein
the binder resin includes an acid-modified polypropylene resin, and
the wax includes an oxidized polyethylene wax,
wherein a content of the acid-modified polypropylene resin is 80 parts by mass or more with respect to 100 parts by mass of the total amount of the binder resin, and
wherein a content of the surfactant is 0.1 to 5 mass % based on the total amount of the aqueous ink composition, and
wherein the acid-modified polypropylene resin has an amount of 0.5 to 2.5% by mass of a total amount of the aqueous ink composition.

2. The aqueous ink composition according to claim 1, wherein the oxidized polyethylene wax has a melting point of 140° C. or lower.

3. The aqueous ink composition according to claim 1, further comprising an acetylene-based surfactant.

4. The aqueous ink composition according to claim 1, wherein the aqueous ink composition is used in printing on a less-ink-absorbent or non-ink-absorbent recording medium.

5. A printed material made by printing the aqueous ink composition according to claim 1 on a surface of a recording medium.

6. The printed material according to claim 5, wherein the recording medium is a less-ink-absorbent or non-ink-absorbent recording medium.

7. A method of producing a printed material, the method comprising ejecting and printing the aqueous ink composition according to claim 1 on a recording medium by an inkjet recording method in which a distance from a surface (x) having ink ejection holes of an inkjet head to a position (y) where a normal to the surface (x) intersects the recording medium is 1 mm or more.

8. The method of producing a printed material according to claim 7, wherein the recording medium is a less-ink-absorbent or non-ink-absorbent recording medium.

9. The aqueous ink composition according to claim 1, wherein the acid-modified polypropylene resin has an amount of 1 to 2.5% by mass of a total amount of the aqueous ink composition.

10. The aqueous ink composition according to claim 1, wherein the oxidized polyethylene wax has a melting point of 140° C. or lower and 120° C. or higher.

* * * * *